United States Patent
Choung et al.

(10) Patent No.: US 10,731,583 B2
(45) Date of Patent: Aug. 4, 2020

(54) SYSTEM AND METHOD OF CONTROLLING OXYGEN PURGE OF THREE-WAY CATALYST

(71) Applicants: Hyundai Motor Company, Seoul (KR); KIA Motors Corporation, Seoul (KR)

(72) Inventors: Jin Woo Choung, Gyeonggi-do (KR); Kiyoung Kwon, Gyeonggi-do (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 16/380,428

(22) Filed: Apr. 10, 2019

(65) Prior Publication Data
US 2020/0173385 A1   Jun. 4, 2020

(30) Foreign Application Priority Data
Dec. 3, 2018  (KR) .......................... 10-2018-0153586

(51) Int. Cl.
| | |
|---|---|
| *F02D 41/02* | (2006.01) |
| *F02D 41/12* | (2006.01) |
| *F01N 3/10* | (2006.01) |
| *F01N 3/20* | (2006.01) |
| *F02D 41/04* | (2006.01) |
| *F02D 43/04* | (2006.01) |
| *F02D 13/02* | (2006.01) |
| *F02P 5/04* | (2006.01) |
| *F02P 5/15* | (2006.01) |
| *F02D 17/02* | (2006.01) |

(52) U.S. Cl.
CPC ........... *F02D 41/027* (2013.01); *F01N 3/101* (2013.01); *F01N 3/20* (2013.01); *F01N 3/2066* (2013.01); *F02D 13/0261* (2013.01); *F02D 17/02* (2013.01); *F02D 41/0295* (2013.01); *F02D 41/042* (2013.01); *F02D 41/123* (2013.01); *F02D 41/126* (2013.01); *F02D 43/04* (2013.01); *F02P 5/045* (2013.01); *F02P 5/15* (2013.01); F01N 2430/06 (2013.01); F01N 2430/08 (2013.01); F01N 2430/10 (2013.01); F02D 2200/0802 (2013.01)

(58) Field of Classification Search
CPC ...... F01N 3/20; F01N 3/2066; F01N 2430/06; F01N 2430/10; F02D 13/0261; F02D 41/027; F02D 41/0295; F02D 41/123; F02D 41/126; F02D 2200/0802
USPC ............ 123/90.15–90.18, 325, 326; 701/104
See application file for complete search history.

(56) References Cited

U.S. PATENT DOCUMENTS

| | | | |
|---|---|---|---|
| 2005/0204725 A1* | 9/2005 | Hoard ..................... | F01N 11/00 60/277 |
| 2009/0030585 A1* | 1/2009 | Aldrich, III .... | B60W 30/18127 701/101 |

(Continued)

*Primary Examiner* — Erick R Solis
(74) *Attorney, Agent, or Firm* — Brinks Gilson & Lione

(57) ABSTRACT

A method of controlling oxygen purge of a three-way catalyst may include: performing a fuel cut-off; determining whether a fuel cut-in condition is satisfied after the fuel cut-off; calculating an optimum valve overlap according to an intake amount, an engine rotation speed, and an ignition timing if the fuel cut-in condition is satisfied after the fuel cut-off; controlling a CVVD apparatus to be at the optimum valve overlap; and performing the oxygen purge at the optimum valve overlap.

13 Claims, 12 Drawing Sheets

(56) References Cited

U.S. PATENT DOCUMENTS

2013/0146006 A1\* 6/2013 Kim .................... F01L 13/0015
123/90.17
2018/0320626 A1\* 11/2018 Surnilla ................ F02D 41/023

\* cited by examiner

SYSTEM AND METHOD OF CONTROLLING OXYGEN PURGE OF THREE-WAY CATALYST

CROSS-REFERENCE TO RELATED APPLICATION

This application claims priority to and the benefit of Korean Patent Application No. 10-2018-0153586, filed on Dec. 3, 2018, the entire contents of which are incorporated herein by reference.

FIELD

The present disclosure relates to a system and a method of controlling oxygen purge of a three-way catalyst. More particularly, the present disclosure relates to a system and a method of controlling oxygen purge of a three-way catalyst which improves purifying performance of a three-way catalyst by controlling an intake duration, an exhaust duration and/or an ignition timing of an engine in the oxygen purge of the three-way catalyst.

BACKGROUND

The statements in this section merely provide background information related to the present disclosure and may not constitute prior art.

Generally, an internal combustion engine generates a power by taking fuel and air into a combustion chamber and burning the air-fuel mixture. When the air is sucked, intake valves are actuated by driving a camshaft, and the air is sucked into the combustion chamber while the intake valves are open. Further, exhaust valves are actuated by driving the camshaft, and exhaust gas is discharged from the combustion chamber while the exhaust valves are open.

However, improved operation of the intake valve and the exhaust valve depend in part on an engine rotation speed. That is, an appropriate valve lift or valve opening and closing timings is (are) changed according to the engine rotation speed. In order to realize an appropriate valve operation in accordance with the engine rotation speed, a plurality of cam shapes for actuating the valves are designed, or a continuously variable valve lift (CVVL) apparatus that implements the valves to operate with different lifts according to the engine rotation speed has been developed.

Further, a continuous variable valve timing (CVVT) technology for adjusting opening times of the valves has been developed, and the CVVT technology is a technique in which the valve opening and closing timings are changed simultaneously with a valve duration being fixed.

In recent years, there has been developed a technique for controlling a duration for which the valves are open (i.e., a valve duration) based on a driving condition of a vehicle, and the technique for controlling the valve duration has been applied to the vehicle.

On the other hand, the vehicle is equipped with a catalytic converter to reduce emission (EM) contained in the exhaust gas. The exhaust gas flowing out from an engine through an exhaust manifold is driven into a catalytic converter mounted at an exhaust pipe and is purified therein. After that, noise of the exhaust gas is decreased while passing through a muffler and then the exhaust gas is emitted into the air through a tail pipe. The catalytic converter purifies the EM contained in the exhaust gas. In addition, a particulate filter for trapping particulate matter (PM) in the exhaust gas is mounted in the exhaust pipe.

A three-way catalyst (TWC) is one type of the catalytic converter and reacts with hydrocarbon (HC) compounds, carbon monoxide (CO) and nitrogen oxides (NOx), which are harmful components of the exhaust gas, to remove these compounds. The TWCs are mainly installed in gasoline vehicles, and Pt/Rh, Pd/Rh or Pt/Pd/Rh systems are used as the TWCs.

The internal combustion engine equipped with the TWC performs a fuel cut-off to improve fuel economy under specific driving conditions. In this case, an oxygen storage material in the TWC stores oxygen ($O_2$) therein. If the fuel cut-off is terminated (i.e., fuel cut-in) in a state that the oxygen storage material stores a large amount of the $O_2$, the TWC cannot reduce but exhaust the NOx contained in the exhaust gas due to the $O_2$ stored in the oxygen storage material. Therefore, air-fuel ratio (AFR) is made to be rich to remove the 02 stored in the oxygen storage material when performing fuel cut-in after the fuel cut-off. This is called 'oxygen purge'.

However, since the AFR in the TWC is lean even during the oxygen purge, the TWC cannot reduce but exhaust the NOx. Therefore, it is desirable to reduce an amount of the NOx generated in the engine during the oxygen purge.

The above information disclosed in this Background section is only for enhancement of understanding of the background of the disclosure and therefore it may contain information that does not form the prior art that is already known in this country to a person of ordinary skill in the art.

SUMMARY

The present disclosure has been made in an effort to provide a system and a method of controlling oxygen purge of a three-way catalyst (TWC) which can reduce an amount of nitrogen oxide (NOx) generated in an engine by adjusting an intake duration, an exhaust duration and/or an ignition timing of the engine.

Another aspect of the present disclosure provides a system and a method of controlling oxygen purge of a three-way catalyst which may improve NOx purifying performance of the TWC by adjusting valve overlap according to an intake amount, an engine rotation speed, and an ignition timing when entering a fuel cut-in after a fuel cut-off, yielding an optimum valve overlap (or a calculated valve overlap, or a desired valve overlap), and thereafter performing the oxygen purge at the optimum valve overlap.

A system of controlling oxygen purge of a three-way catalyst according to an aspect of the present disclosure may include: an engine including a combustion chamber, an intake valve equipped at the combustion chamber and configured to selectively supply air or air-fuel mixture into the combustion chamber, an ignition plug equipped at the combustion chamber and configured to ignite and burn the air-fuel mixture, and an exhaust valve equipped at the combustion chamber and configured to selectively discharge exhaust gas in the combustion chamber to an outside of the combustion chamber; a continuously variable valve duration (CVVD) apparatus configured to adjust an intake duration of the intake valve and an exhaust duration of the exhaust valve; and a controller configured to control an ignition timing of the ignition plug, the intake duration, and the exhaust duration based on a driving condition of a vehicle, wherein the three-way catalyst is disposed on an exhaust pipe downstream of the engine and configured to purify emission contained in the exhaust gas, and wherein the controller controls the CVVD apparatus to be an optimum valve overlap according to an intake amount, an engine rotation speed, and the ignition timing and performs the oxygen purge at the optimum valve overlap when entering a fuel cut-in where the fuel is injected again after a fuel cut-off where a fuel injection is stopped.

In one aspect, the controller may adjust the optimum valve overlap by maintaining a current intake duration and controlling an exhaust valve close (EVC) timing according to the current intake duration.

In another aspect, the controller may adjust the optimum valve overlap by maintaining a current exhaust duration and controlling an intake valve open (IVO) timing according to the current exhaust duration.

In other aspect, the controller may maintain a current exhaust valve open (EVO) timing and a current intake valve close (IVC) timing and may control the EVC timing and the IVO timing according to the optimum (or calculated) valve overlap.

The controller may perform the fuel cut-off when a temperature of the TWC is higher than a predetermined temperature. That is, if the temperature of the TWC is lower than or equal to the predetermined temperature, the fuel cut-off is not performed.

The oxygen purge may be performed by controlling a fuel injection amount to be a rich air-fuel ratio (AFR). That is, a lambda of the exhaust gas is controlled to be lower than 1 in the oxygen purge.

A method of controlling oxygen purge of a three-way catalyst according to another aspect of the present disclosure may include: performing a fuel cut-off; determining whether a fuel cut-in condition is satisfied after the fuel cut-off; calculating an optimum (or calculated) valve overlap according to an intake amount, an engine rotation speed, and an ignition timing if the fuel cut-in condition is satisfied after the fuel cut-off; controlling a CVVD apparatus to be at the optimum valve overlap; and performing the oxygen purge at the optimum valve overlap, wherein the CVVD apparatus is configured to adjust an intake duration of an intake valve and an exhaust duration of an exhaust valve.

In one aspect, the controlling a CVVD apparatus may include: maintaining a current intake duration; and controlling an EVC timing according to the current intake duration.

In another aspect, the controlling a CVVD apparatus may include: maintaining a current exhaust duration; and controlling an IVO timing according to the current exhaust duration.

In other aspect, the controlling a CVVD apparatus may include: maintaining a current EVO timing and a current IVC timing; controlling an IVO timing; and controlling an EVC timing according to the optimum valve overlap and the controlled IVO timing.

In other aspect, the controlling a CVVD apparatus may include: maintaining a current EVO timing and a current IVC timing; controlling an EVC timing; and controlling an IVO timing according to the optimum valve overlap and the controlled EVC timing.

The method may further include determining, before performing the fuel cut-off, whether a temperature of a TWC is higher than a predetermined temperature, wherein the fuel cut-off is performed only when the temperature of the TWC is higher than the predetermined temperature.

The oxygen purge may be performed by controlling a fuel injection amount to be a rich air-fuel ratio.

According to the aspects of the present disclosure, the amount of the NOx generated in the engine can be reduced by adjusting the intake duration, the exhaust duration and/or the ignition timing of the engine.

Further, NOx purifying performance can be improved by adjusting the optimum valve overlap according to the intake amount, the engine rotation speed, and the ignition timing when entering the fuel cut-in after the fuel cut-off, and performing the oxygen purge at the calculated valve overlap.

In addition, other effects of the present disclosure are directly or implicitly described in the description provided herein. Various effects predicted according to the present disclosure will be disclosed in the description provided herein.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

The aspects herein may be better understood by referring to the following description in conjunction with the accompanying drawings in which like reference numerals indicate identically or functionally similar elements, of which:

Figure 1:
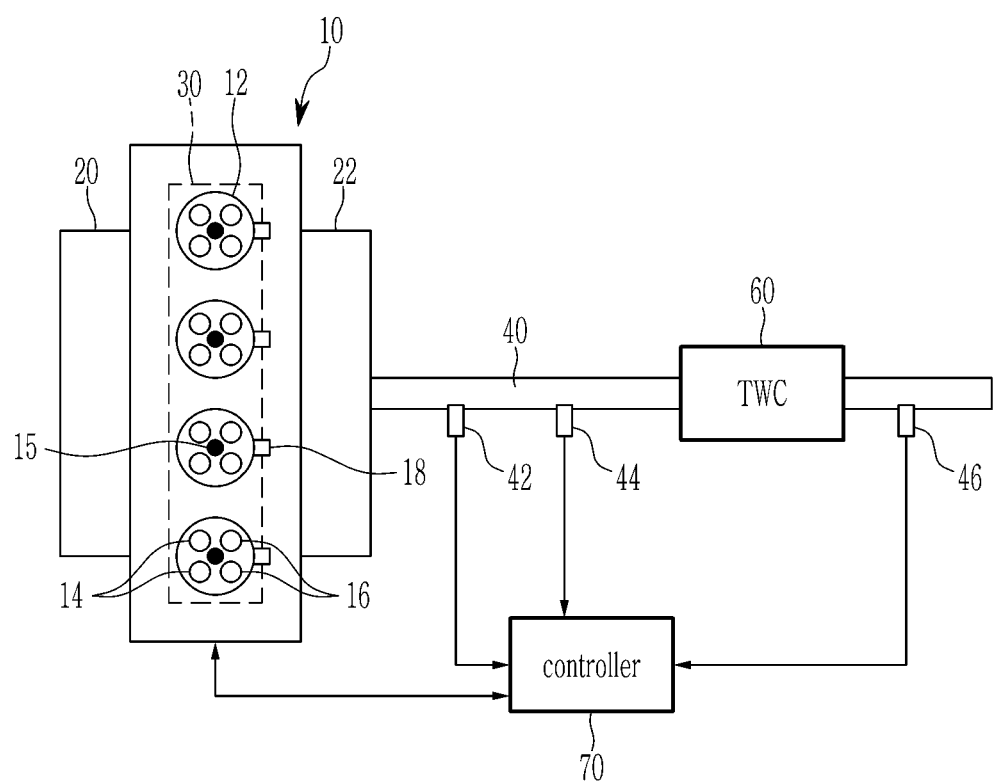
FIG. 1 is a schematic diagram of a system of controlling oxygen purge of a three-way catalyst according to an aspect of the present disclosure.

It should be understood that the above-referenced drawings are not necessarily to scale, presenting a somewhat simplified representation of various features illustrative of the basic principles of the disclosure. The specific design features of the present disclosure, including, for example, specific dimensions, orientations, locations, and shapes, will be determined in part by the particular intended application and use environment.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The terminology used herein is for the purpose of describing particular aspects only and is not intended to be limiting of the present disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. The term "coupled" denotes a physical relationship between two components whereby the components are either directly connected to one another or indirectly connected via one or more intermediary components.

It is understood that the term "vehicle," "vehicular," "car," or other similar term as used herein is inclusive of motor vehicles, in general, such as passenger automobiles including sports utility vehicles (SUV), buses, trucks, various commercial vehicles, watercraft including a variety of boats and ships, aircraft, and the like, and includes hybrid vehicles, electric vehicles, hybrid electric vehicles, hydrogen-powered vehicles and other alternative fuel vehicles (e.g., fuels derived from resources other than petroleum).

Additionally, it is understood that one or more of the below methods, or aspects thereof, may be executed by at least one controller. The term "controller" may refer to a hardware device that includes a memory and a processor. The memory is configured to store program instructions, and the processor is specifically programmed to execute the program instructions to perform one or more processes which are described further below. Moreover, it is understood that the below methods may be executed by a system comprising the controller, as described in detail below.

Furthermore, the controller of the present disclosure may be embodied as non-transitory computer readable media containing executable program instructions executed by a processor or the like. Examples of the computer readable mediums include, but are not limited to, ROM, RAM, compact disc (CD)-ROMs, magnetic tapes, floppy disks, flash drives, smart cards, and optical data storage devices. The computer readable recording medium can also be distributed throughout a computer network so that the program instructions are stored and executed in a distributed fashion, e.g., by a telematics server or a Controller Area Network (CAN).

Hereinafter, aspects of the present disclosure will be described in detail with reference to the accompanying drawings.

FIG. 1 is a schematic diagram of a system of controlling oxygen purge of a three-way catalyst according to an aspect of the present disclosure.

As shown in FIG. 1, a system of controlling oxygen purge of a three-way catalyst according to an aspect of the present disclosure includes an engine 10, a continuously variable valve duration (CVVD) apparatus 30, an exhaust pipe 40, a three-way catalyst (TWC) 60, and a controller 70.

The engine 10 burns a mixture of air and fuel to convert chemical energy into mechanical energy. The engine 10 includes a combustion chamber 12, an intake valve 14, an ignition plug 15, an exhaust valve 16, an injector 18, an intake manifold 20, and an exhaust manifold 22.

The combustion chamber 12 is connected to the intake manifold 20 to receive an air or the mixture of the air and fuel therein. An intake port is formed at the combustion chamber 12 and is equipped with the intake valve 14. The intake valve 14 is operated by rotation of a camshaft connected to a crankshaft to open or close the intake port. When the intake valve 14 opens the intake port, the air or the mixture of the air and the fuel in the intake manifold 20 flows into the combustion chamber 12 through the intake port. When the intake valve 14 closes the intake port, on the contrary, the air or the mixture of the air and the fuel in the intake manifold 20 does not flow into the combustion chamber 12. In addition, the combustion chamber 12 is connected to the exhaust manifold 22 so that the exhaust gas generated in the combustion process is collected in the exhaust manifold 22 and flows out to the exhaust pipe 40. An exhaust port is formed at the combustion chamber 12 and is equipped with the exhaust valve 16. The exhaust valve 16 is also operated by the rotation of the camshaft connected to the crankshaft to open or close the exhaust port. When the exhaust valve 16 opens the exhaust port, the exhaust gas in the combustion chamber 12 flows to the exhaust manifold 22 through the exhaust port. When the exhaust valve 16 closes the exhaust port, on the contrary, the exhaust gas in the combustion chamber 12 does not flow to the exhaust manifold 22.

Depending on types of the engine, the combustion chamber 12 may be equipped with the injector 18 to inject the fuel into the combustion chamber 12 (e.g., in case of a gasoline direct injection engine). In addition, depending on the types of the engine, the ignition switch 15 may be provided at a top of the combustion chamber 12 to ignite the mixture of the air and the fuel mixture in the combustion chamber 12 (e.g., in case of a gasoline engine).

The CVVD apparatus 30 is mounted at an upper portion of the engine 10 and adjusts a duration of the intake valve 14 and a duration of the exhaust valve 16. The CVVD apparatus 30 is constructed by incorporating an intake CVVD apparatus for variably controlling the duration of the intake valve 14 and an exhaust CVVD apparatus for variably controlling the duration of the exhaust valve 16. Various CVVD apparatus known so far, such as a CVVD apparatus disclosed in Korean Patent No. 1619394, can be used as the CVVD apparatus 30, and the entire contents of Korean Patent No. 1619394 are incorporated herein by reference. Also, in addition to the CVVD apparatus disclosed in Korean Patent No. 1619394, various CVVD apparatuses known so far can be used, and it is to be understood that the CVVD apparatus according to the aspects of the present disclosure is not limited to the CVVD apparatus disclosed in Korean Patent No. 1619394.

Here, the duration of the intake valve 14 is referred to as an 'intake duration'. The intake duration is defined as a duration from when the intake valve 14 is open to when the intake valve 14 is closed. In addition, a timing at which the intake valve 14 is open is referred to as an intake valve open (IVO) timing, and a timing at which the intake valve 14 is closed is referred to as an intake valve close (IVC) timing. Therefore, the intake duration is the duration from the IVO timing to the IVC timing.

Here, the duration of the exhaust valve 16 is referred to as an 'exhaust duration'. The exhaust duration is defined as a duration from when the exhaust valve 16 is open to when the exhaust valve 16 is closed. In addition, a timing at which the exhaust valve 16 is open is referred to as an exhaust valve open (EVO) timing, and a timing at which the exhaust valve 16 is closed is referred to as an exhaust valve close (EVC) timing. Therefore, the exhaust duration is the duration from the EVO timing to the EVC timing.

Here, a period for which the intake valve 14 and the exhaust valve 16 are opened together in an intake stroke is referred to as a 'valve overlap'. That is, the valve overlap is defined as the period from the IVO timing to the EVC timing in the intake stroke.

The exhaust pipe 40 is connected to the exhaust manifold 22 to discharge the exhaust gas to an outside of a vehicle. Various catalytic converters are mounted on the exhaust pipe 40 to remove emission (EM) contained in the exhaust gas. For convenience of explanation, the TWC 60 is mounted on the exhaust pipe 40, but it is to be understood that the catalytic converter mounted on the exhaust pipe 40 is not limited to the TWC 60.

The TWC 60 is disposed on the exhaust pipe 40 through which the exhaust gas discharged from the engine 10 flows, and harmful materials including CO, HC, and NOx contained in the exhaust gas are converted into harmless components by an oxidation-reaction reaction in the TWC 60. Since the TWC 60 is well known to a person of an ordinary skill in the art, a detailed description thereof will be omitted.

The exhaust pipe 40 is equipped with a plurality of sensors 42, 44, and 46 for detecting a combustion state and a function of the TWC 60.

The temperature sensor 42 is mounted on the exhaust pipe 40 at an upstream of the TWC 60, detects a temperature of the exhaust gas at the upstream of the TWC 60, and transmits a signal corresponding thereto to the controller 70.

The first oxygen sensor 44 is mounted on the exhaust pipe 40 at the upstream of the TWC 60, detects $O_2$ concentration in the exhaust gas at the upstream of the TWC 60, and transmits a signal corresponding thereto to the controller 70.

The second oxygen sensor 46 is mounted on the exhaust pipe 40 at a downstream of the TWC 60, detects $O_2$ concentration in the exhaust gas at the downstream of the TWC 60, and transmits a signal corresponding thereto to the controller 70.

Figure 2:
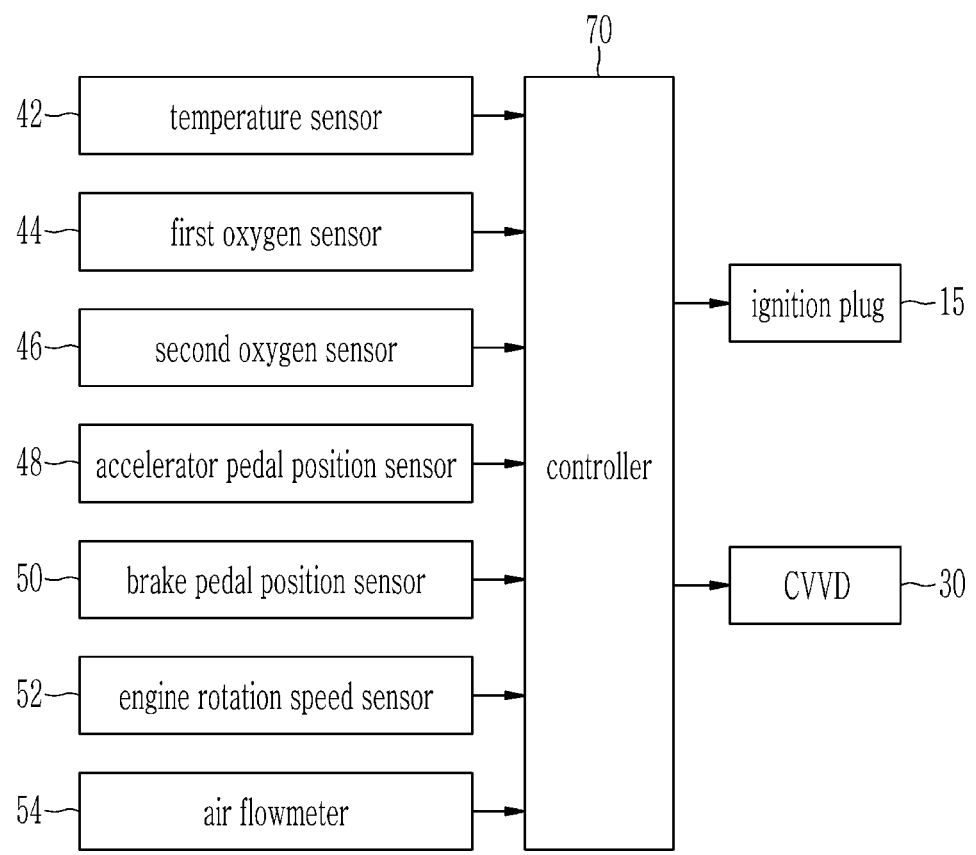
FIG. 2 is a block diagram of a system of controlling oxygen purge of a three-way catalyst.

In addition to the sensors 42, 44, and 46 described herein, a system for controlling the engine may further includes various sensors. For example, an additional temperature sensor may be mounted on the exhaust pipe 40 at the downstream of the TWC 60 to detect the temperature of the exhaust gas at the downstream of the TWC 60. In addition, as shown in FIG. 2, the system of controlling the oxygen purge of the TWC may further include an accelerator pedal position sensor 48, a brake pedal position sensor 50, an engine rotation speed sensor 52, and an air flowmeter 54. Further, the system of controlling the oxygen purge of the TWC may further include a NOx sensor, an HC sensor or a CO sensor mounted on the exhaust pipe 40, and concentration of the EM contained in the exhaust gas can be detected via these sensors.

The controller 70 is electrically connected to the sensors 42, 44, 46, 48, 50, 52, and 54 to receive the signals corresponding to the detected values by the sensors 42, 44, 46, 48, 50, 52, and 54, and determines the combustion state, whether the TWC 60 normally operates, and/or a driving condition of the vehicle based on the signals. The controller 70 controls at least one of an ignition timing of the ignition plug 15, the intake duration (including the IVO timing and the IVC timing), and the exhaust duration (including the EVO timing and the EVC timing) based on the determination results. The controller 70 may be implemented with one or more processors executed by a predetermined program and the predetermined program may be programmed to perform each step of a method of controlling oxygen purge of a three-way catalyst according to the aspect of the present disclosure.

Hereinafter, with reference to FIG. 2, inputs and outputs of the controller 70 in the system of controlling the oxygen purge of the TWC according to the aspects of the present disclosure will be described in more detail.

FIG. 2 is a block diagram of a system of controlling oxygen purge of a three-way catalyst.

FIG. 2 is a simplified illustration of the inputs and the outputs of the controller 70 for implementing the system of controlling the oxygen purge of the TWC according to the aspects of the present disclosure, and it is to be understood that the inputs and the outputs of the controller 70 is not limited to the aspect illustrated in FIG. 2.

As shown in FIG. 2, the controller 70 is electrically connected to the temperature sensor 42, the first and second oxygen sensors 44 and 46, the accelerator pedal position sensor 48, the brake pedal position sensor 50, the engine rotation speed sensor 52, and the air flowmeter 54, and receives the signals corresponding to the detected values by the sensors 42, 44, 46, 48, 50, 52, and 54.

The temperature sensor 42 detects the temperature of the exhaust gas at the upstream of the TWC 60 and transmits the signal corresponding thereto to the controller 70. The controller 70 predicts a bed temperature of the TWC 60 based on the signal.

The first oxygen sensor 44 detects the $O_2$ concentration in the exhaust gas at the upstream of the TWC 60 and transmits the signal corresponding thereto to the controller 70. The second oxygen sensor 46 detects the $O_2$ concentration in the exhaust gas at the downstream of the TWC 60 and transmits the signal corresponding thereto to the controller 70. The controller 70 determines whether the TWC operates normally and performs an air-fuel ratio control of the engine 10 based on the signals of the first and second oxygen sensors 44 and 46.

The accelerator pedal position sensor 48 detects a displacement of an accelerator pedal and transmits a signal corresponding thereto to the controller 70. For example, if a driver does not depress the accelerator pedal at all, the displacement of the accelerator pedal may be 0%, and if the driver fully depresses the accelerator pedal, the displacement of the accelerator pedal may be 100%. The displacement of the accelerator pedal indicates the driver's will to accelerate.

The brake pedal position sensor 50 detects a displacement of a brake pedal and transmits a signal corresponding thereto to the controller 70. For example, if the driver does not depress the brake pedal at all, the displacement of the brake pedal may be 0%, and if the driver fully depresses the brake pedal, the displacement of the brake pedal may be 100%.

The engine rotation speed sensor 52 detects a rotation speed of the engine 10 and transmits a signal corresponding thereto to the controller 70.

The air flowmeter 54 is mounted on an intake pipe or an intake duct to detect the amount of the air flowing into the intake system, and transmits the signal corresponding thereto to the controller 70.

The controller 70 controls operation of at least one of the ignition plug 15 and the CVVD 30 based on the detected values by the sensors 42, 44, 46, 48, 50, 52, and 54. That is, the controller 70 controls the ignition timing of the ignition plug 15, the intake duration (including the IVO timing and the IVC timing), and/or the exhaust duration (including EVO timing and the EVC timing).

Here, referring to FIG. 3 to FIG. 5, effects of the ignition timing and the valve overlap on an amount of the NOx, an amount of total hydrocarbon (THC), and an amount of the CO in the exhaust gas at the upstream and the downstream of the TWC 60 during the oxygen purge in a first operating condition will be described.

Figure 3:
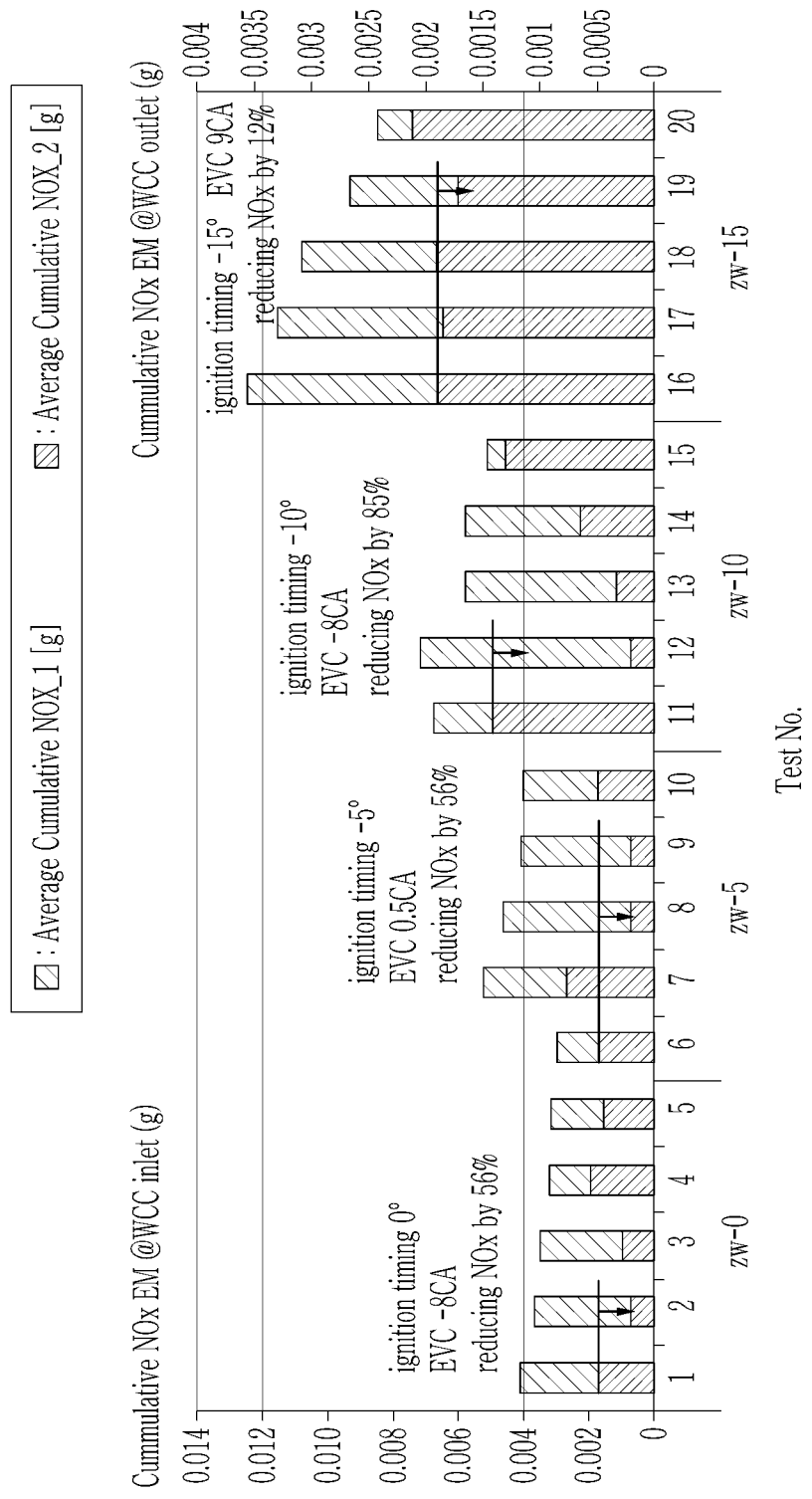
FIG. 3 is a graph showing an amount of NOx contained in an exhaust gas at an upstream and a downstream of a TWC when an ignition timing and a valve overlap are changed during oxygen purge in a first operating condition.

FIG. 3 is a graph showing an amount of NOx contained in an exhaust gas at an upstream and a downstream of a TWC when an ignition timing and a valve overlap are changed during oxygen purge in a first operating condition; FIG. 4 is a graph showing an amount of total hydrocarbon contained in an exhaust gas at an upstream and a downstream of a TWC when an ignition timing and a valve overlap are changed during oxygen purge in a first operating condition; and FIG. 5 is a graph showing an amount of CO contained in the exhaust gas at an upstream and a downstream of a TWC when an ignition timing and a valve overlap are changed during oxygen purge in a first operating condition.

Here, the first operating condition simulates an idle condition, and the engine rotation speed is 1,600 rpm and an engine torque is 5 Nm in the first operating condition. In addition, the intake duration is maintained (i.e., the IVO timing and the IVC timing are constant), the EVO timing is maintained, and the EVC timing is changed.

Figure 4:
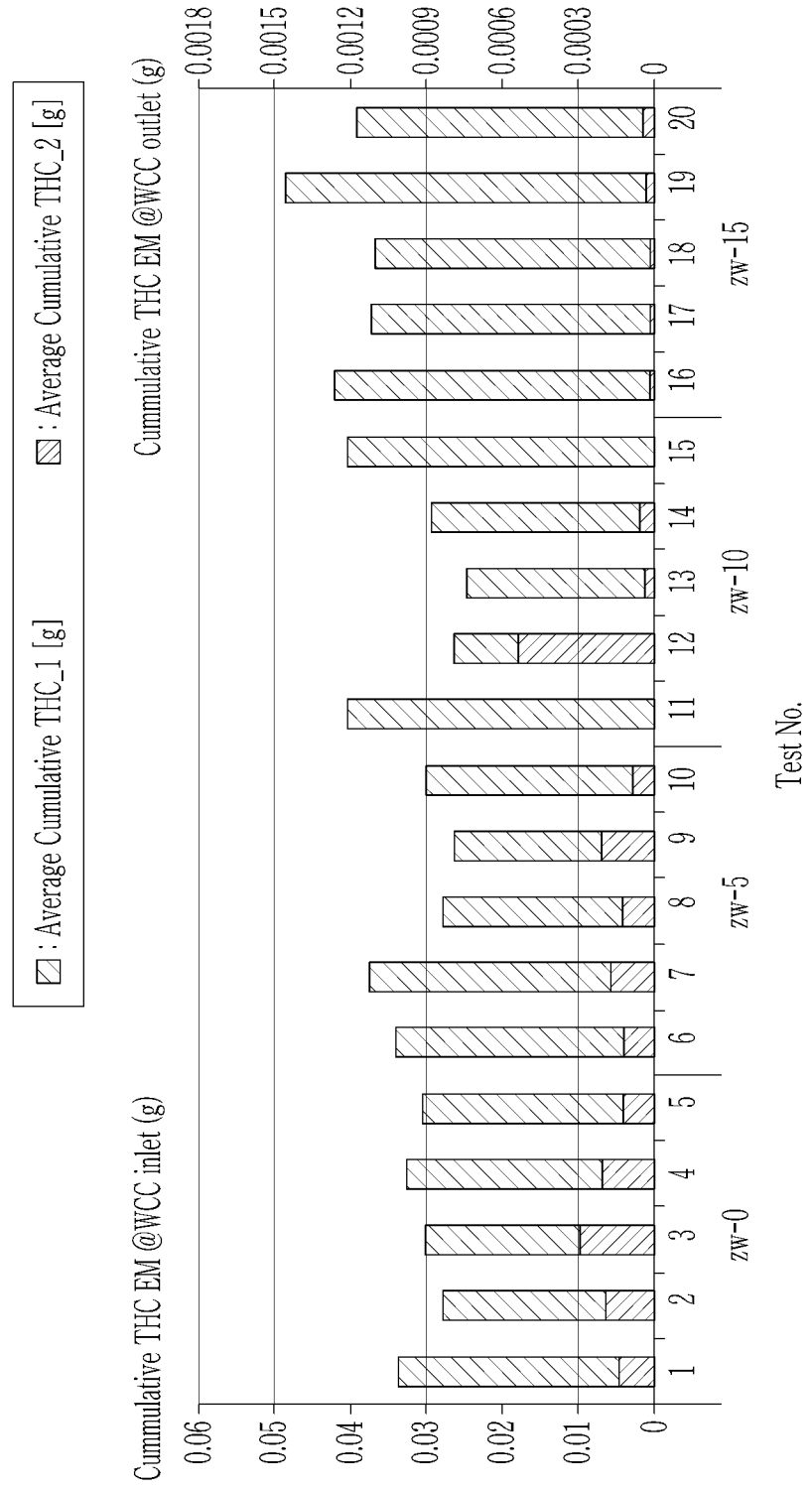
FIG. 4 is a graph showing an amount of total hydrocarbon contained in an exhaust gas at an upstream and a downstream of a TWC when an ignition timing and a valve overlap are changed during oxygen purge in a first operating condition.
Figure 5:
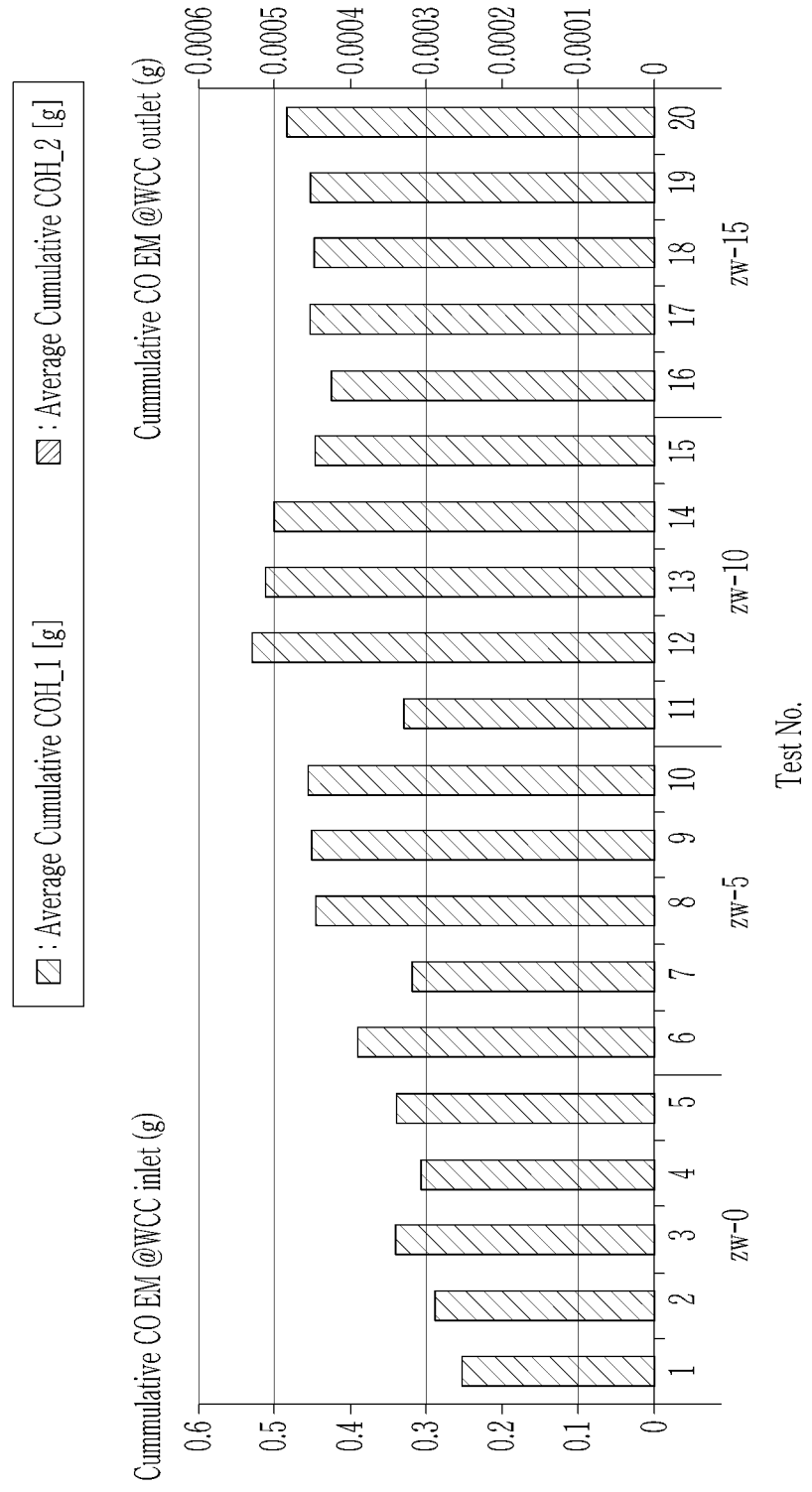
FIG. 5 is a graph showing an amount of CO contained in the exhaust gas at an upstream and a downstream of a TWC when an ignition timing and a valve overlap are changed during oxygen purge in a first operating condition.

The EVO timing, the EVC timing, an overlap, and the ignition timing in each test No. illustrated in FIG. 3 to FIG. 5 is described in [Table 1].

TABLE 1

| Test No. | EVO timing | EVC timing | Overlap | Ignition timing |
|---|---|---|---|---|
| 1~5 | −209.5 | −16.5 | −46.2 | 0 |
| 6~10 | | −8 | −37.7 | −5 |
| 11~15 | | 0.5 | −29.2 | −10 |
| 16~20 | | 9 | −20.7 | −15 |
| | | 17.5 | −12.2 | |

In the EVO timing, the EVC timing, and the ignition timing, '−' sign means prior to 'top dead center (TDC)'. In test No. 1 to test No. 5, the EVC timing is changed −16.5 CA (crank angle), −8 CA, 0.5 CA, 9 CA, and 17.5 CA in a state that the EVO timing is maintained to −209.5 CA and the ignition timing is maintained to 0°. Experiments in test No. 6 to test No. 20 are also conducted in a similar manner.

Here, the overlap is a value obtained by subtracting the IVO timing from the EVC timing in a state where the intake valve 14 and the exhaust valve 16 are raised by 1 mm from respective valve seats. Therefore, a period for which the intake valve 14 is open and a period for which the exhaust valve 16 is open begin to overlap at the overlap of −37.7 CA.

If the overlap is −46.2 CA, the period for which the intake valve 14 is open and the period for which the exhaust valve 16 is open do not overlap, and if the overlap is −29.2 CA, the valve overlap of the intake valve 14 and the exhaust valve 16 is 8.5 CA.

In addition, the ignition timings described in [Table 1] is examples of the ignition timings that can actually occur in the idle condition.

As shown in FIG. 3, the more the ignition timing is lag, the larger the amount of the NOx in the exhaust gas at the upstream of the TWC 60 (corresponding to the amount of the NOx generated in the engine 10) is. Further, as the valve overlap is increased while the ignition timing is maintained, the amount of the NOx in the exhaust gas at the upstream of the TWC 60 is reduced. However, there is little correlation between the increase in the valve overlap and the amount of the NOx in the exhaust gas at the downstream of the TWC 60 in a state where the ignition timing is fixed. Instead, there is the valve overlap at which the smallest amount of the NOx exists in the exhaust gas at the downstream of the TWC 60 at each ignition timing.

For example, if the ignition timing is 0°, the amount of the NOx in the exhaust gas at the downstream of the TWC 60 is the smallest when the EVC timing is −8 CA (crank angle). The amount of the NOx in the exhaust gas at the downstream of the TWC 60 when the ignition timing is 0° and the EVC timing is −8 CA is about 56% smaller than the amount of the NOx in the exhaust gas at the downstream of the TWC 60 when the ignition timing is 0° and the EVC timing is −16.5 CA.

Similarly, if the ignition timing is −5°, the amount of the NOx in the exhaust gas at the downstream of the TWC 60 is the smallest when the EVC timing is 0.5 CA. The amount of the NOx in the exhaust gas at the downstream of the TWC 60 when the ignition timing is −5° and the EVC timing is 0.5 CA is about 56% smaller than the amount of the NOx in the exhaust gas at the downstream of the TWC 60 when the ignition timing is −5° and the EVC timing is −16.5 CA.

In addition, if the ignition timing is −10°, the amount of the NOx in the exhaust gas at the downstream of the TWC 60 is the smallest when the EVC timing is −8 CA. The amount of the NOx in the exhaust gas at the downstream of the TWC 60 when the ignition timing is −10° and the EVC timing is −8 CA is about 85% smaller than the amount of the NOx in the exhaust gas at the downstream of the TWC 60 when the ignition timing is −10° and the EVC timing is −16.5 CA.

In addition, if the ignition timing is −15°, the amount of the NOx in the exhaust gas at the downstream of the TWC 60 is the smallest when the EVC timing is 9 CA. The amount of the NOx in the exhaust gas at the downstream of the TWC 60 when the ignition timing is −15° and the EVC timing is 9 CA is about 12% smaller than the amount of the NOx in the exhaust gas at the downstream of the TWC 60 when the ignition timing is −15° and the EVC timing is −16.5 CA.

As described above, the optimum valve overlap for reducing the NOx according to the ignition timing during the oxygen purge in the first operating condition exists.

As shown in FIGS. 4 and 5, the amount of the THC and the amount of the CO at the upstream and the downstream of the TWC during the oxygen purge in the first operating condition are not correlated with the ignition timing and the valve overlap. However, the amount of the THC and the amount of the CO at the downstream of the TWC 60 during the oxygen purge in the first operating condition are very small. Thus, it can be seen that no special control is required to reduce the THC and the CO at the downstream of the TWC 60 during the oxygen purge in the first operating condition.

Here, referring to FIG. 6 to FIG. 8, effects of the ignition timing and the valve overlap on an amount of the NOx, an amount of total hydrocarbon (THC), and an amount of the CO in the exhaust gas at the upstream and the downstream of the TWC 60 during the oxygen purge in a second operating condition will be described.

Figure 6:
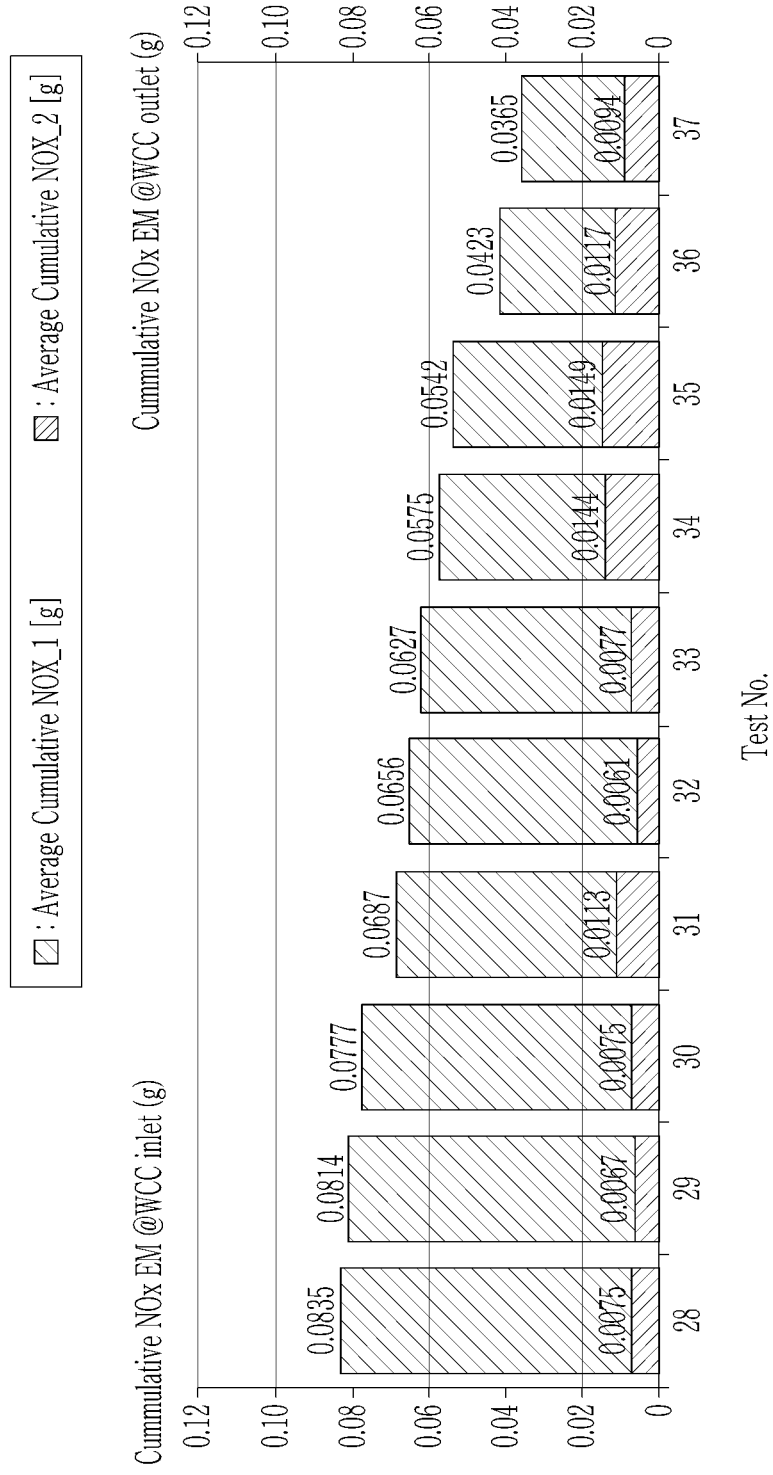
FIG. 6 is a graph showing an amount of NOx contained in an exhaust gas at an upstream and a downstream of a TWC when an ignition timing and a valve overlap are changed during oxygen purge in a second operating condition.

FIG. 6 is a graph showing an amount of NOx contained in an exhaust gas at an upstream and a downstream of a TWC when an ignition timing and a valve overlap are changed during oxygen purge in a second operating condition; FIG. 7 is a graph showing an amount of total hydrocarbon contained in an exhaust gas at an upstream and a downstream of a TWC when an ignition timing and a valve overlap are changed during oxygen purge in a second operating condition; and FIG. 8 is a graph showing an amount of CO contained in the exhaust gas at an upstream and a downstream of a TWC when an ignition timing and a valve overlap are changed during oxygen purge in a second operating condition.

Here, the second operating condition simulates a tip-in condition (i.e., a condition for depressing the accelerator pedal), and the engine speed is 1,600 rpm and the engine torque is 80 Nm in the second operating condition. In addition, the intake duration is maintained (i.e., the IVO timing and the IVC timing are constant), the EVO timing is maintained, and the EVC timing is changed.

Figure 7:
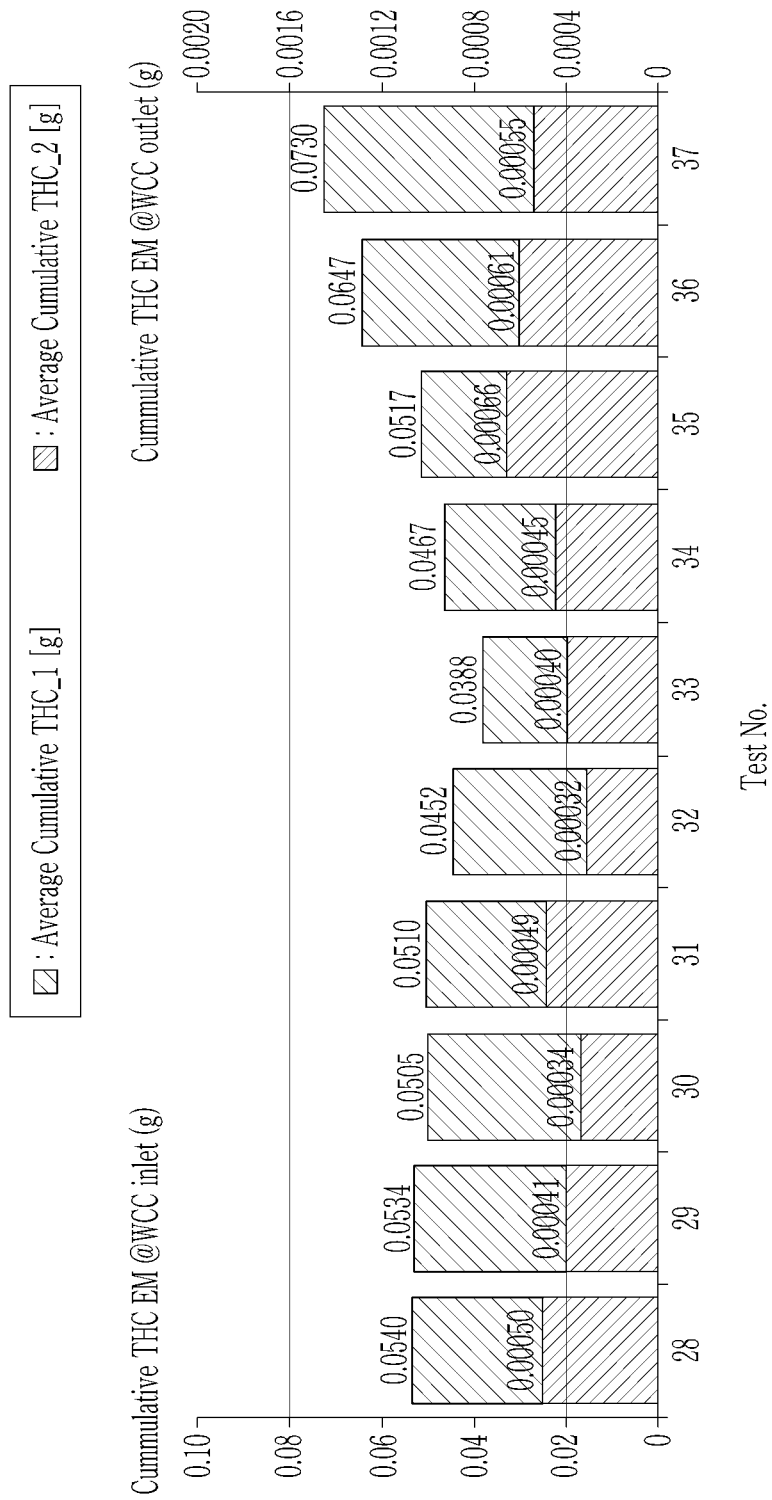
FIG. 7 is a graph showing an amount of total hydrocarbon contained in an exhaust gas at an upstream and a downstream of a TWC when an ignition timing and a valve overlap are changed during oxygen purge in a second operating condition.
Figure 8:
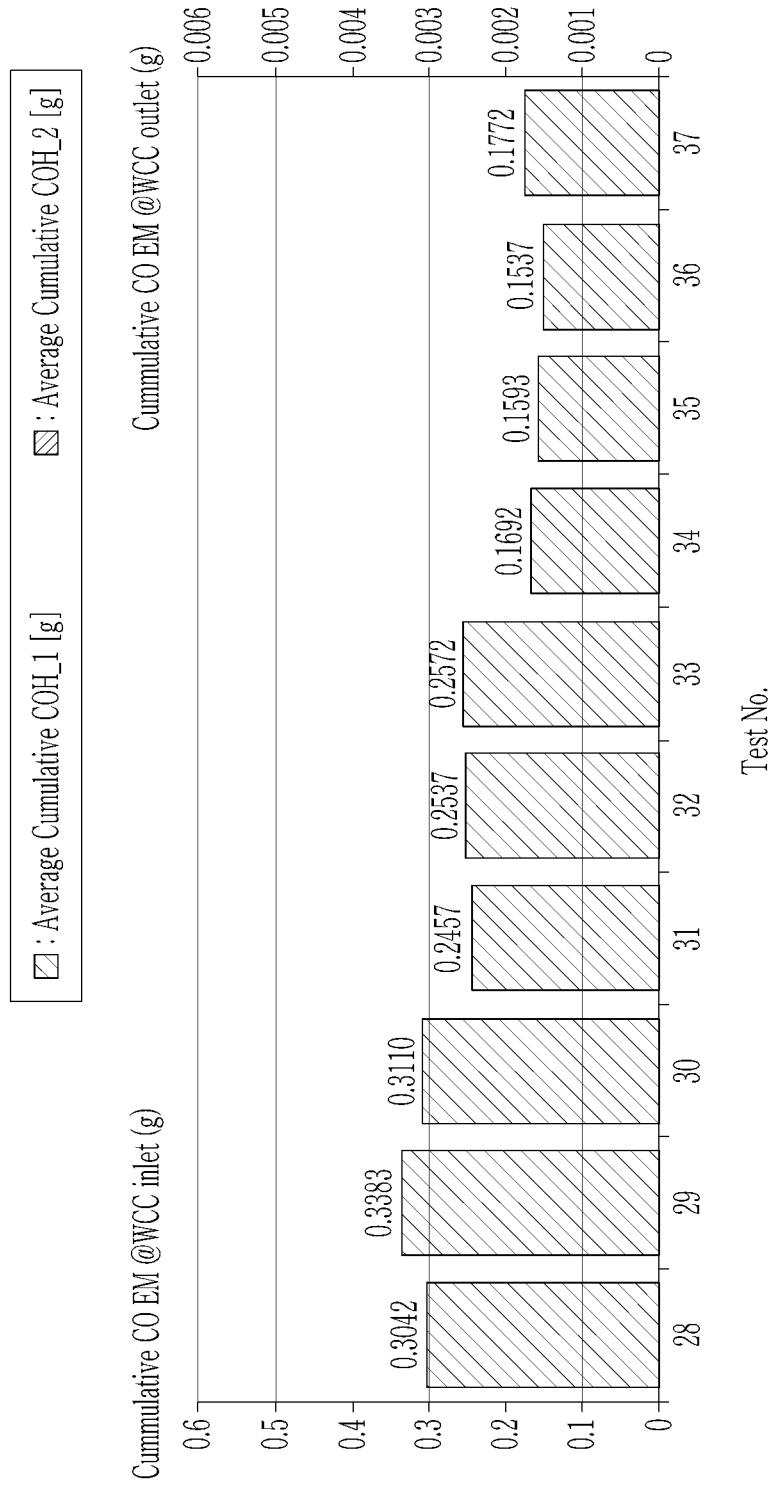
FIG. 8 is a graph showing an amount of CO contained in the exhaust gas at an upstream and a downstream of a TWC when an ignition timing and a valve overlap are changed during oxygen purge in a second operating condition.

The EVO timing, the EVC timing, the overlap, and the ignition timing in each test No. illustrated in FIG. 6 to FIG. 8 is described in [Table 2].

TABLE 2

| Test No. | EVO timing | EVC timing | Overlap | Ignition timing | Note |
|---|---|---|---|---|---|
| 28 | −209.5 | −16.5 | −46.5 | 17.25 | MBT |
| 29 | | −8 | −37.7 | 17.25 | MBT |
| 30 | | 0.5 | −29.2 | 18 | MBT |
| 31 | | 9 | −20.7 | 18.75 | MBT |
| 32 | | 17.5 | −12.2 | 19.5 | MBT |
| 33 | | 26 | −3.7 | 20.25 | MBT |
| 34 | | 34.5 | 4.8 | 21 | MBT |
| 35 | | 43 | 13.3 | 21 | DBL |
| 36 | | 51.5 | 21.8 | 21 | DBL |
| 37 | | 59.5 | 29.8 | 20.25 | DBL |

In test No. 28 to test No. 37, the EVC timing and the ignition timing are changed in a state that the EVO timing is maintained to −209.5 CA. In addition, the ignition timing is limited to a minimum spark advance for best torque (MBT) and a denotation border line (DBL) in consideration of actual operating conditions of the vehicle.

Here, the overlap is the value obtained by subtracting the IVO timing from the EVC timing in a state where the intake valve 14 and the exhaust valve 16 are raised by 1 mm from the respective valve seats. Therefore, the period for which the intake valve 14 is open and the period for which the exhaust valve 16 is open begin to overlap at the overlap of −37.7 CA. If the overlap is −46.2 CA, the period for which the intake valve 14 is open and the period for which the exhaust valve 16 is open do not overlap, and if the overlap is −29.2 CA, the valve overlap of the intake valve 14 and the exhaust valve 16 is 8.5 CA.

As shown in FIG. 6, as the valve overlap is increased, the amount of the NOx in the exhaust gas at the upstream of the TWC 60 is reduced. However, there is little correlation between the increase in the valve overlap and the amount of the NOx in the exhaust gas at the downstream of the TWC 60. Instead, there is the valve overlap at which the smallest amount of the NOx exists in the exhaust gas at the downstream of the TWC 60

For example, the amount of the NOx in the exhaust gas at the downstream of the TWC 60 when the ignition timing is 19.5°, the EVO timing is −209.5 CA and the EVC timing is 17.5 CA is about 18% smaller than the amount of the NOx in the exhaust gas at the downstream of the TWC 60 when the ignition timing is 17.25°, the EVO timing is −209.5 CA and the EVC timing is −16.5 CA (i.e., there is no valve overlap).

As described above, the optimum valve overlap for reducing the NOx during the oxygen purge in the second operating condition exists.

As shown in FIG. 7, the amount of the THC in the exhaust gas at the upstream of the TWC 60 during the oxygen purge in the second operating condition decreases and then increases again as the valve overlap increases. However, the amount of the THC in the exhaust gas at the downstream of the TWC 60 during the oxygen purge in the second operating condition is not correlated with the valve overlap. Instead, it can be seen that the amount of the THC at the downstream of the TWC 60 during the oxygen purge in the second operating condition is very small, and no special control is required to reduce the THC.

As shown in FIG. 8, the amount of the CO in the exhaust gas at the upstream of the TWC 60 during the oxygen purge in the second operating condition decreases as the valve overlap increases. However, the amount of the CO at the downstream of the TWC 60 during the oxygen purge in the second operating condition is very small. Therefore, it can be seen that no special control is required for reducing the CO at the downstream of the TWC 60 during the oxygen purge in the second operating condition.

To summarize the graphs illustrated in FIG. 3 to FIG. 8, the THC or the CO is sufficiently purified by the TWC 60 during the oxygen purge, so that no special control is required to reduce the THC or the CO. However, it can be seen that the NOx can be further purified by from at least 18% up to 85% if the oxygen purge is performed at the calculated valve overlap for each ignition timing. Therefore, in order to inhibit deterioration of NOx purifying performance during the oxygen purge, it can be seen that the oxygen purge should be performed at the optimum valve overlap for each ignition timing.

Hereinafter, a method of controlling oxygen purge of a three-way catalyst according to an aspect of the present disclosure will be described in detail with reference to FIG. 9.

Figure 9:
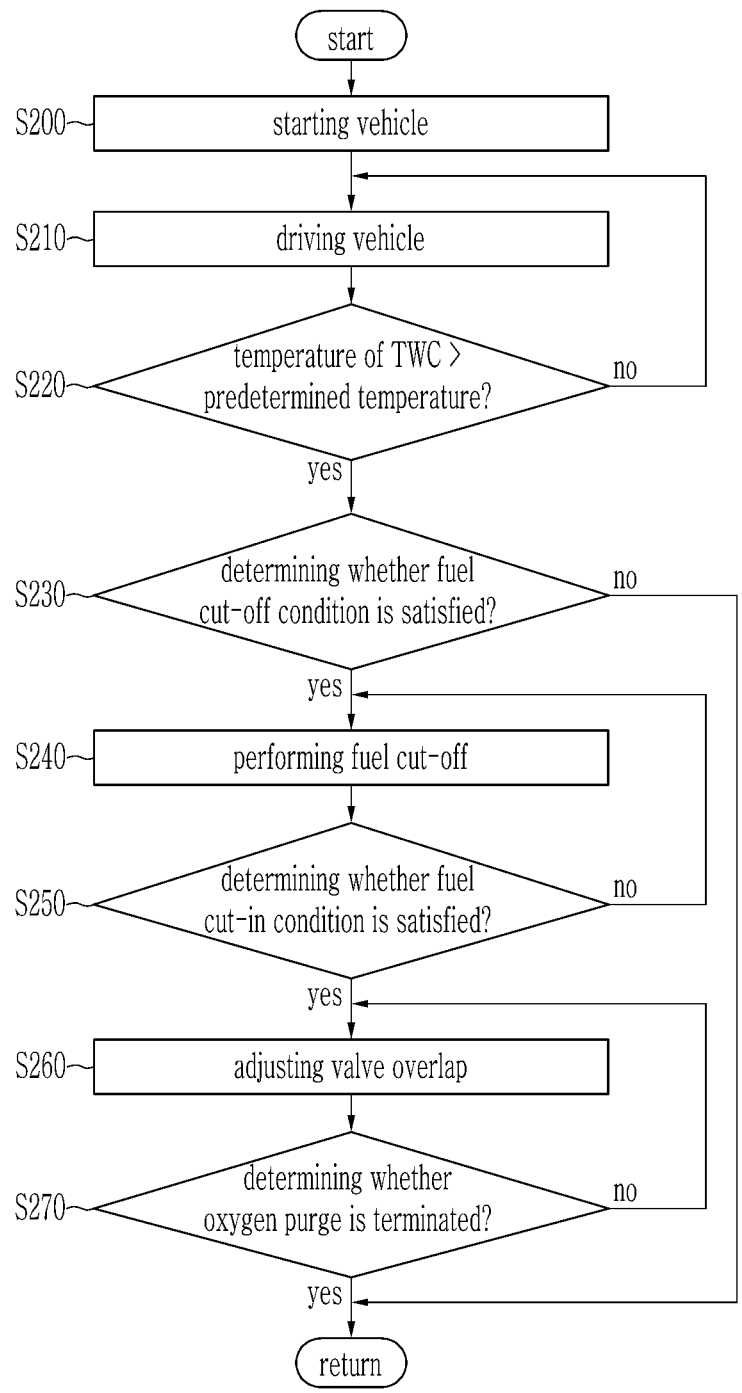
FIG. 9 is a flowchart of a method of controlling oxygen purge of a three-way catalyst according to an aspect of the present disclosure.

FIG. 9 is a flowchart of a method of controlling oxygen purge of a three-way catalyst according to an aspect of the present disclosure.

When the vehicle is started at step S200, the vehicle is driven depending on manipulation of a driver at step S210. That is, the controller 70 determines a current driving condition based on the signals transmitted from the plurality of sensors 42, 44, 46, 48, 50, 52, and 54, sets the ignition timing, the intake duration, and the exhaust duration according to the current driving condition, and operates the engine 10 according to the ignition timing, the intake duration and the exhaust duration.

While the vehicle is driven, the controller 70 determines whether a temperature of the TWC 60 is higher than a predetermined temperature at step S220. That is, it is determined whether the temperature of the TWC 60 is sufficiently raised to purify the EM. For example, the predetermined temperature may be, but is not limited to, 350° C.

If the temperature of the TWC 60 is lower than or equal to the predetermined temperature at the step S220, the controller 70 returns to the step S210 and the vehicle is driven depending on the manipulation of the driver before the engine is turned off. Further, the controller 70 does not enter a fuel cut-off mode.

If the temperature of the TWC 60 is higher than the predetermined temperature at the step S220, the controller 70 determines whether a fuel cut-off condition is satisfied at step S230. For example, if a driver releases his or her foot from the accelerator pedal on a downhill road, the fuel cut-off condition may be met. Since the fuel cut condition is well known to those skilled in the art, further description will be omitted.

If the fuel cut-off condition is not satisfied at the step S230, the controller 70 terminates the method of controlling oxygen purge of a three-way catalyst according to the aspect of the present disclosure. Accordingly, the vehicle is driven depending on the manipulation of the driver before the engine is turned off.

If the fuel cut-off condition is satisfied at the step S230, the controller 70 performs the fuel cut-off at step S240. Thus, supply of the fuel into the combustion chamber 12 is stopped and the vehicle travels by inertia.

During the fuel cut-off, the controller 70 determines whether a fuel cut-in condition is satisfied at step S250. For example, the fuel cut-in condition may be satisfied if the driver accelerates the vehicle by depressing the accelerator pedal again. Since the fuel cut-in condition is well known to those skilled in the art, further description will be omitted.

If the fuel cut-in condition is not satisfied at the step S250, the controller 70 returns to the step S240 and continues to cut off the supply of the fuel into the combustion chamber 12.

If the fuel cut-in condition is satisfied at the step S250, the controller 70 resumes the supply of the fuel that has stopped. Further, an oxygen storage material in the TWC 60 is prepared to remove $O_2$ stored therein due to the fuel cut-off. That is, the oxygen purge is prepared.

More specifically, in order to prepare the oxygen purge, the controller 70 determines an appropriate ignition timing based on a position of the accelerator pedal and/or the engine rotational speed and the like. That is, a demand torque of the driver is determined based on the position of the accelerator pedal and/or the engine rotational speed and the like, and the ignition timing necessary for generating the demand torque is determined.

Thereafter, the controller 70 determines the optimum valve overlap according to the intake amount, the engine rotation speed, and the ignition timing, and controls the CVVD apparatus 30 to operate the engine 10 at the optimum valve overlap at step S260.

To adjust the optimum valve overlap, the controller 70 selects one of the following three methods.

Figure 10:
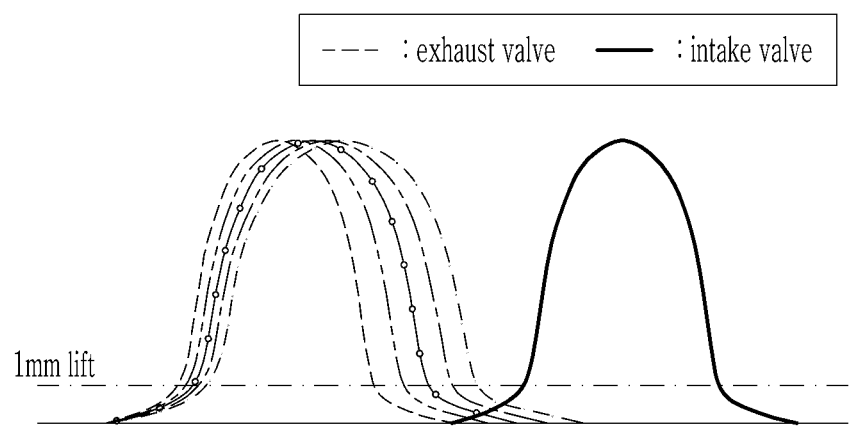
FIG. 10 is a graph illustrating adjusting an EVC timing to achieve an optimum valve opening.

In a first method, as shown in FIG. 10, the optimum valve overlap is adjusted using the exhaust CVVD apparatus. That is, the controller 70 maintains the current intake duration and adjusts the EVC timing according to the current intake duration. In further detail, the controller 70 maintains the IVO timing and the IVC timing at constant values and adjusts the EVC timing according to the IVO timing to adjust the optimum valve overlap.

Figure 11:
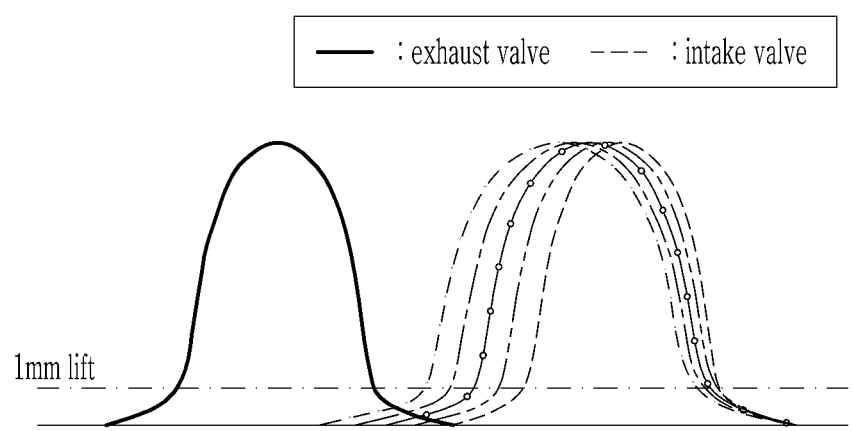
FIG. 11 is a graph illustrating adjusting an IVO timing to achieve an optimum valve opening.

In a second method, as shown in FIG. 11, the optimum valve overlap is adjusted using the intake CVVD apparatus. That is, the controller 70 maintains the current exhaust duration and adjusts the IVO timing according to the current exhaust duration. In further detail, the controller 70 maintains the EVO timing and the EVC timing at constant values and adjusts the IVO timing according to the EVC timing to adjust the optimum valve overlap.

Figure 12:
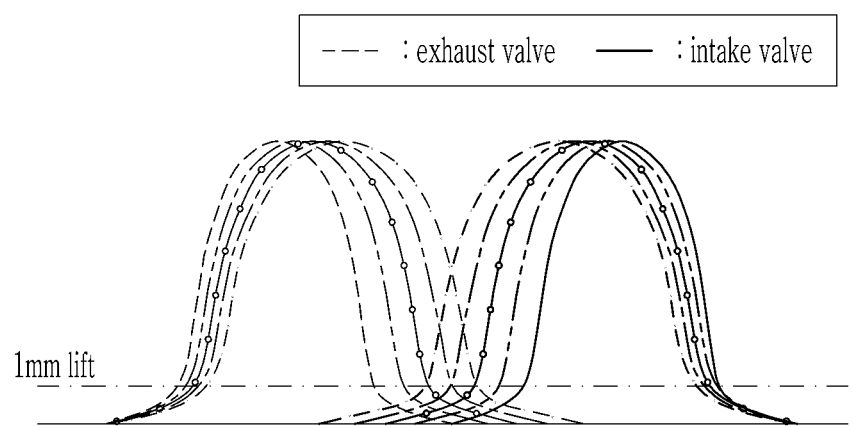
FIG. 12 is a graph illustrating adjusting an EVC timing and an IVO timing to achieve an optimum valve opening.

In a third method, as shown in FIG. 12, the optimum valve overlap is adjusted using the CVVD apparatus. That is, the controller 70 maintains the current EVO timing and the current IVC timing and adjusts the EVC timing and the IVO timing according to the optimum valve overlap. At this time, the controller 70 may adjust the EVC timing and then the IVO timing according to the optimum valve overlap and the adjusted EVC timing, or adjust the IVO timing and then the EVC timing according to the optimum valve overlap and the adjusted IVO timing.

If the valve overlap has been adjusted at the step S260, the controller 70 performs the oxygen purge at the optimum valve overlap. That is, the $O_2$ stored in the oxygen storage material of the TWC 60 is removed by controlling the fuel injection amount such that an air-fuel ratio (AFR) of the exhaust gas becomes rich.

Thereafter, the controller 70 determines whether the oxygen purging is terminated at step S270. Typically, the oxygen purge is performed for a predetermined time according to an amount of the oxygen storage material and the like. Thus, the controller 70 may determine whether the oxygen purge is terminated by determining whether the predetermined time has elapsed since the oxygen purge was started. However, the determination of whether the oxygen purge is terminated is not limited to the above-mentioned method, and may be performed using various methods known to those skilled in the art at the time of filing this application.

If the oxygen purge is not terminated at the step S270, the controller 70 returns to the step S260. If the oxygen purge is terminated at the step S270, the controller 70 terminates the method of controlling oxygen purge of a three-way catalyst according to the aspect of the present disclosure. That is, the controller 70 returns the IVO timing, the IVC timing, the EVO timing, and the EVC timing, which have been adjusted for the oxygen purge, to the IVO timing, the IVC timing, the EVO timing, and the EVC timing set according to the driving condition, and the vehicle travels under the IVO timing, the IVC timing, the EVO timing, and the EVC timing set according to the driving condition.

While this disclosure has been described in connection with what is presently considered to be practical aspects, it is to be understood that the disclosure is not limited to the disclosed aspects. On the contrary, it is intended to cover various modifications and equivalent arrangements included within the spirit and scope of the appended claims.

What is claimed is:

1. A system of controlling oxygen purge of a three-way catalyst, comprising:
    an engine including a combustion chamber, an intake valve equipped at the combustion chamber and configured to selectively supply air or an air-fuel mixture into the combustion chamber, an ignition plug equipped at the combustion chamber and configured to ignite and burn the air-fuel mixture, and an exhaust valve equipped at the combustion chamber and configured to selectively discharge exhaust gas in the combustion chamber to an outside of the combustion chamber;
    a continuously variable valve duration (CVVD) apparatus configured to adjust an intake duration of the intake valve and an exhaust duration of the exhaust valve; and a controller configured to control an ignition timing of the ignition plug, the intake duration, and the exhaust duration based on a driving condition of a vehicle, wherein the three-way catalyst is disposed on an exhaust pipe downstream of the engine and configured to purify emission contained in the exhaust gas, and wherein the controller controls the CVVD apparatus to be an optimum valve overlap according to an intake amount, an engine rotation speed, and the ignition timing and performs oxygen purge at the optimum valve overlap when entering a fuel cut-in where fuel is injected again after a fuel cut-off where a fuel injection is stopped.

2. The system of claim 1, wherein the controller adjusts the optimum valve overlap by maintaining a current intake duration and controlling an exhaust valve close (EVC) timing according to the current intake duration.

3. The system of claim 1, wherein the controller adjusts the optimum valve overlap by maintaining a current exhaust duration and controlling an intake valve open (IVO) timing according to the current exhaust duration.

4. The system of claim 1, wherein the controller maintains a current exhaust valve open (EVO) timing and a current intake valve close (IVC) timing and controls an EVC timing and an IVO timing according to the optimum valve overlap.

5. The system of claim 1, wherein the controller performs the fuel cut-off when a temperature of the TWC is higher than a predetermined temperature.

6. The system of claim 5, wherein the oxygen purge is performed by controlling a fuel injection amount to be a rich air-fuel ratio.

7. A method of controlling oxygen purge of a three-way catalyst, comprising:
performing a fuel cut-off;
determining, by a controller, whether a fuel cut-in condition is satisfied after the fuel cut-off;
calculating, by the controller, an optimum valve overlap according to an intake amount, an engine rotation speed, and an ignition timing if the fuel cut-in condition is satisfied after the fuel cut-off;
controlling a continuously variable valve duration (CVVD) apparatus to be at the optimum valve overlap; and
performing the oxygen purge at the optimum valve overlap,
wherein the CVVD apparatus is configured to adjust an intake duration of an intake valve and an exhaust duration of an exhaust valve.

8. The method of claim 7, wherein the controlling a CVVD apparatus comprises:
maintaining a current intake duration; and
controlling an exhaust valve close (EVC) timing according to the current intake duration.

9. The method of claim 7, wherein the controlling a CVVD apparatus comprises:
maintaining a current exhaust duration; and
controlling an intake valve open (IVO) timing according to the current exhaust duration.

10. The method of claim 7, wherein the controlling a CVVD apparatus comprises:
maintaining a current exhaust valve open (EVO) timing and a current intake valve close (IVC) timing;
controlling an IVO timing; and
controlling an EVC timing according to the optimum valve overlap and the controlled IVO timing.

11. The method of claim 7, wherein the controlling a CVVD apparatus comprises:
maintaining a current EVO timing and a current IVC timing;
controlling an EVC timing; and
controlling an IVO timing according to the optimum valve overlap and the controlled EVC timing.

12. The method of claim 7, further comprising determining, before performing the fuel cut-off, whether a temperature of a TWC is higher than a predetermined temperature,
wherein the fuel cut-off is performed only when the temperature of the TWC is higher than the predetermined temperature.

13. The method of claim 12, wherein the oxygen purge is performed by controlling a fuel injection amount to be a rich air-fuel ratio.

* * * * *